(12) United States Patent
Suzuki et al.

(10) Patent No.: US 8,036,095 B2
(45) Date of Patent: Oct. 11, 2011

(54) SIGNAL PROCESSING DEVICE FOR OPTICAL DISKS AND OPTICAL DISK APPARATUS

(75) Inventors: Tatsuo Suzuki, Kyoto (JP); Katsuo Hori, Fukuoka (JP); Toshihiko Iga, Hyogo (JP)

(73) Assignee: Panasonic Corporation, Osaka (JP)

( * ) Notice: Subject to any disclaimer, the term of this patent is extended or adjusted under 35 U.S.C. 154(b) by 196 days.

(21) Appl. No.: 12/516,046

(22) PCT Filed: Nov. 25, 2008

(86) PCT No.: PCT/JP2008/003462
§ 371 (c)(1),
(2), (4) Date: May 22, 2009

(87) PCT Pub. No.: WO2009/107176
PCT Pub. Date: Sep. 3, 2009

(65) Prior Publication Data
US 2010/0046332 A1  Feb. 25, 2010

(30) Foreign Application Priority Data

Feb. 27, 2008  (JP) .................................. 2008-045494

(51) Int. Cl.
*G11B 7/00* (2006.01)
(52) U.S. Cl. ............... 369/124.1; 369/44.27; 369/44.29; 369/44.35; 369/44.36
(58) Field of Classification Search ............... 369/44.29, 369/124.1, 125, 44.36, 44.26, 44.35
See application file for complete search history.

(56) References Cited

U.S. PATENT DOCUMENTS

| | | | | |
|---|---|---|---|---|
| 4,866,688 A | * | 9/1989 | Ohtake et al. | 369/44.13 |
| 5,757,748 A | * | 5/1998 | Kiyoura et al. | 369/44.29 |
| 5,862,111 A | | 1/1999 | Arai | |
| 6,298,019 B1 | * | 10/2001 | Watanabe et al. | 369/44.27 |
| RE40,946 E | * | 10/2009 | Watanabe et al. | 369/44.27 |
| 2002/0105896 A1 | * | 8/2002 | Kusumoto et al. | 369/125 |
| 2005/0063286 A1 | * | 3/2005 | Hsu et al. | 369/124.1 |
| 2005/0157626 A1 | * | 7/2005 | Lin et al. | 369/124.11 |
| 2007/0058502 A1 | * | 3/2007 | Huang et al. | 369/44.35 |

FOREIGN PATENT DOCUMENTS

| | | |
|---|---|---|
| JP | 2001-266371 | 9/2001 |
| JP | 2001-297454 | 10/2001 |

* cited by examiner

*Primary Examiner* — Thuy Pardo
(74) *Attorney, Agent, or Firm* — McDermott Will & Emery LLP (57) ABSTRACT

A signal processing device for optical disks includes a reflected light process section configured to convert reflected light received by an optical pickup into an electric signal based on a first gain, wherein the optical pickup emits laser light to an optical disk and receives reflected light from the optical disk; a servo signal generation section configured to generate a servo signal by using the electric signal generated by the reflected light process section; a servo signal control section configured to control the servo signal so that a change in the amplitude of the servo signal, in response to an increase or decrease of the amount of the reflected light from the optical disk, is suppressed using an attenuator that attenuates the servo signal generated by the servo signal generation section by a factor of a second gain; and a gain setting section configured to set the first gain to the reflected light process section and the second gain to the servo signal control section substantially simultaneously.

10 Claims, 11 Drawing Sheets

SIGNAL PROCESSING DEVICE FOR OPTICAL DISKS AND OPTICAL DISK APPARATUS

RELATED APPLICATIONS

This application is the U.S. National Phase under 35 U.S.C. §371 of International Application No. PCT/JP2008/003462, filed on Nov. 25, 2008, which in turn claims the benefit of Japanese Application No. 2008-045494, filed on Feb. 27, 2008, the disclosures of which Applications are incorporated by reference herein.

TECHNICAL FIELD

The present invention relates to signal processing devices for optical disks and optical disk apparatuses that record data on, erase data from, or reproduce data from an optical disk using laser light. More particularly, the present invention relates to signal processing devices for optical disks and optical disk apparatuses that control servo signals.

BACKGROUND ART

Patent Document 1 as listed below discloses an optical disk apparatus that includes an optical pickup, which emits laser light to an optical disk and receives reflected light from the optical disk, a servo signal generation section (error signal generation section), which generates servo signals (servo error signals) by using electric signals based on the reflected light, a servo signal control section (gain tuning section), which controls the servo signals whose offsets are adjusted so that the amplitude of servo signals will be kept constant.

Patent Document 1: Japanese Unexamined Patent Application Publication No. 2001-297454

DISCLOSURE OF INVENTION

Technical Problem

Figure 7:
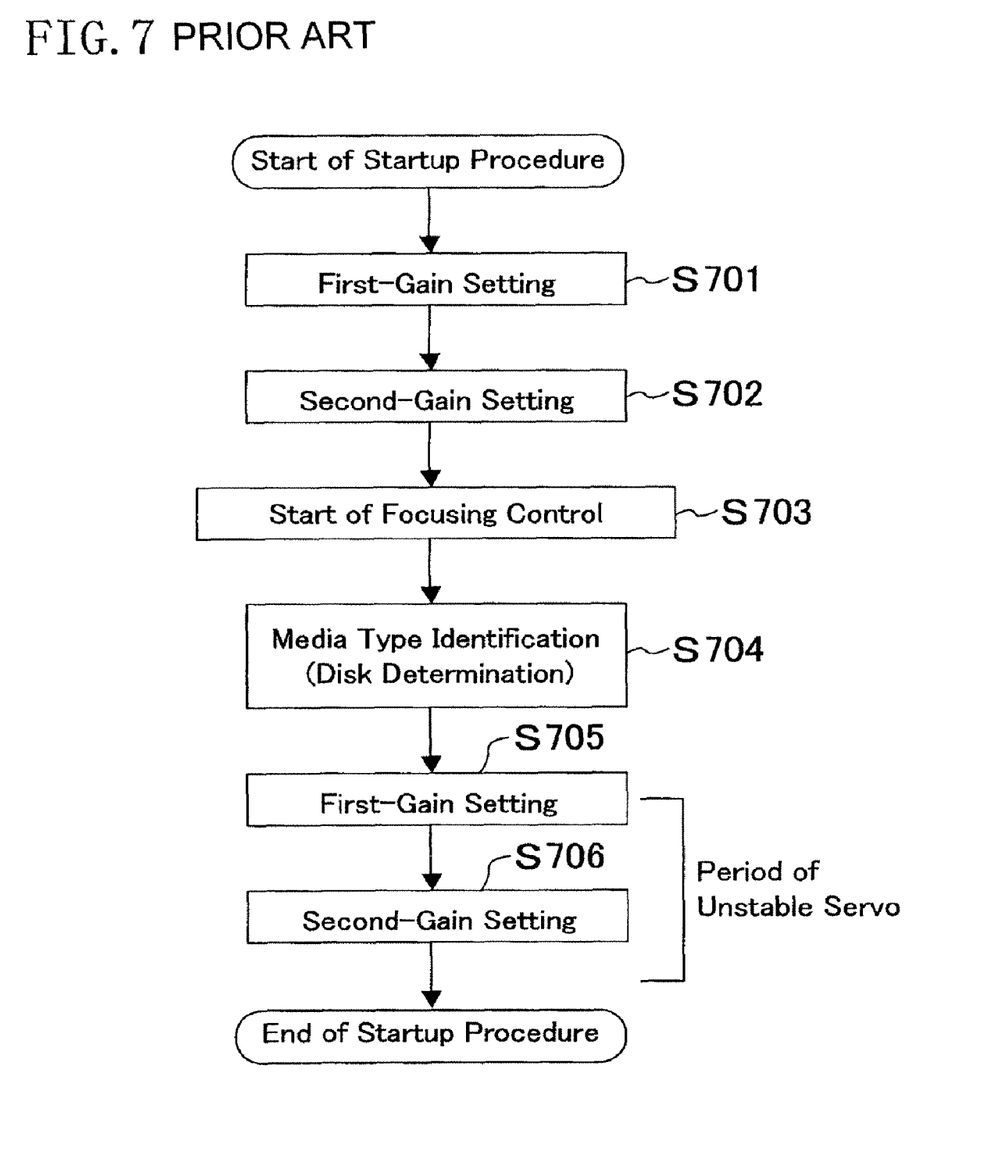
FIG. 7 is a flowchart showing a startup procedure to be executed by a conventional optical disk apparatus.

Beyond what is disclosed in Patent Document 1 as listed above, when, in an optical disk apparatus, a gain to be used by a servo signal control section (hereinafter referred to as "first gain") and a gain to be used for conversion of reflected light received by the optical pickup into an electric signal (hereinafter referred to as "second gain") are controlled, setting operations of the first and the second gains can be performed in a startup procedure of the optical disk apparatus by executing a flow as shown in FIG. 7.

First, a CPU sets the first and the second gains to predetermined values at steps S701 and S702 respectively. Focusing control starts at step S703. Next, at step S704, the media type is identified based on a focus error signal, which is part of servo signals generated by the servo signal generation section. Then, at step S705, the CPU sets (changes) the first gain to a specific value appropriate for the media type identified at step S704. Finally at step S706, the CPU sets the second gain to a specific value appropriate for the media type identified at step S704. This completes the setup procedure. The CPU performs the gain setting operations at steps S705 and S706 usually by executing instructions stored in a system control firmware section.

However, a flow shown in FIG. 7 causes a problem that a period of an unstable servo signal may occur during the period between the first-gain setting operation by the CPU at step S705 and the second-gain setting operation by the CPU at step S706, or immediately after the second-gain setting operation by the CPU at step S706.

Figure 8:
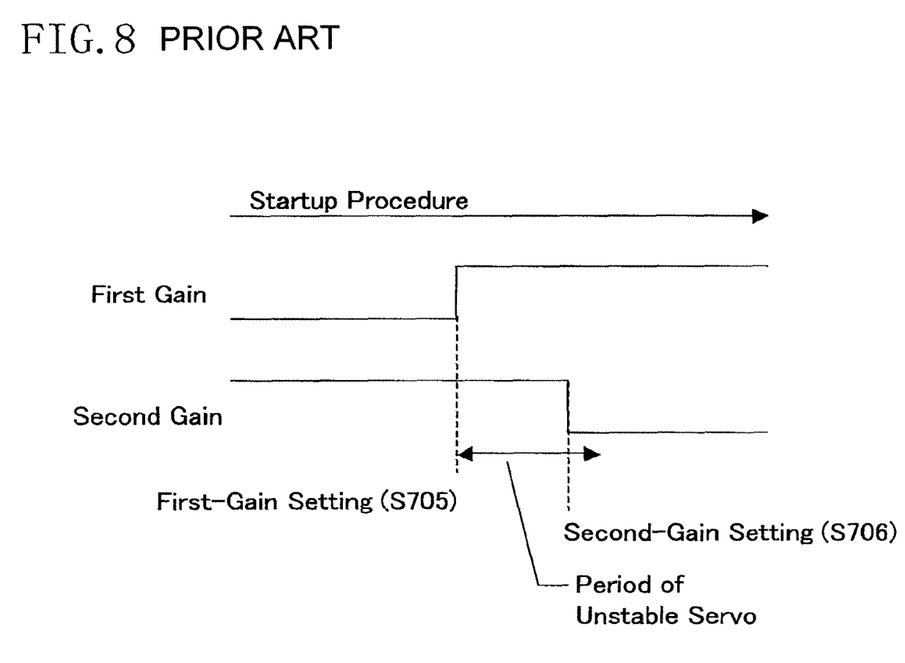
FIG. 8 is a timing chart of the same, showing levels of the first and the second gains.
Figure 9:
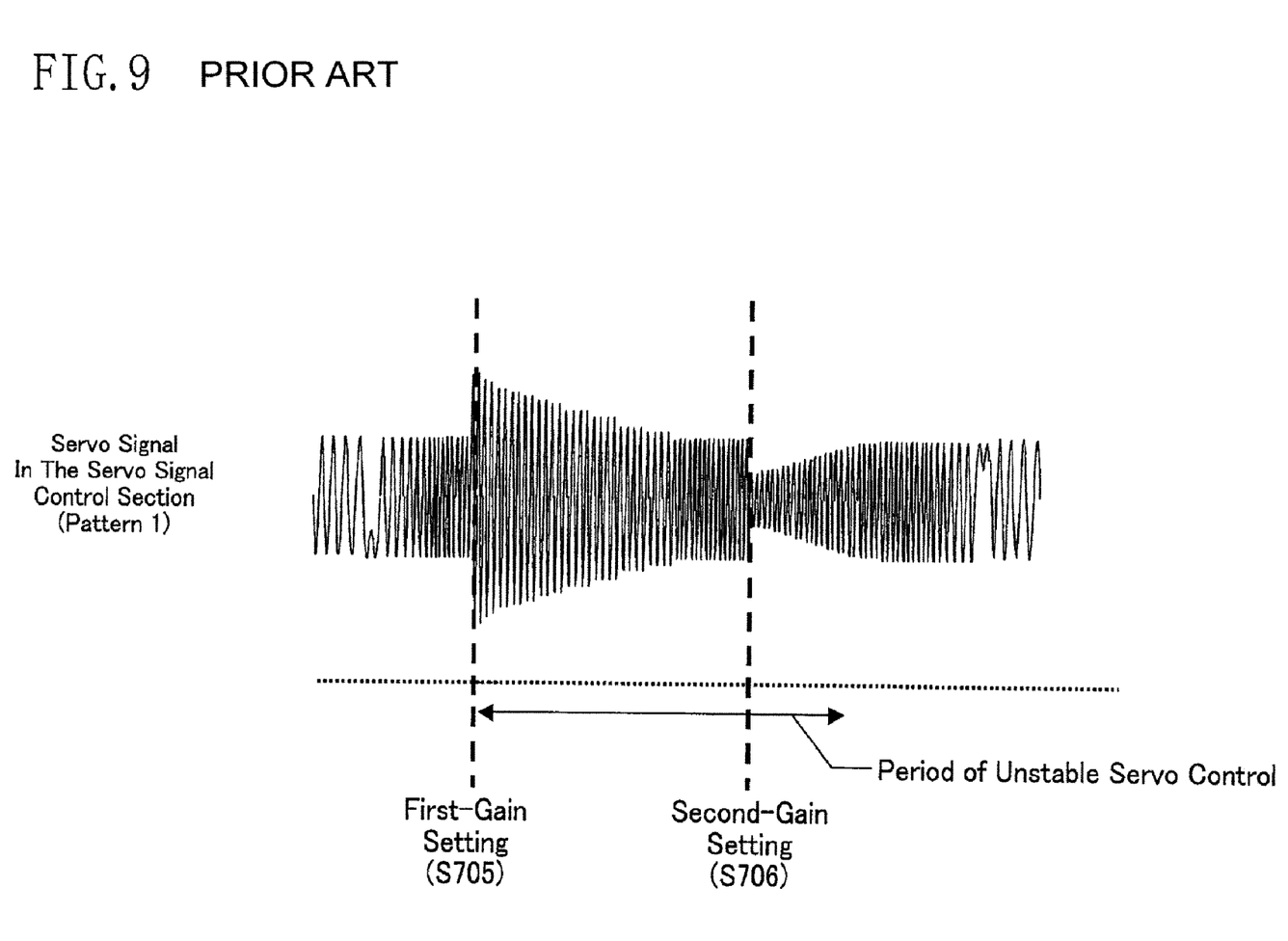
FIG. 9 is a waveform plot of the same, showing an example of waveform of a servo signal controlled by a servo signal control section.
Figure 10:
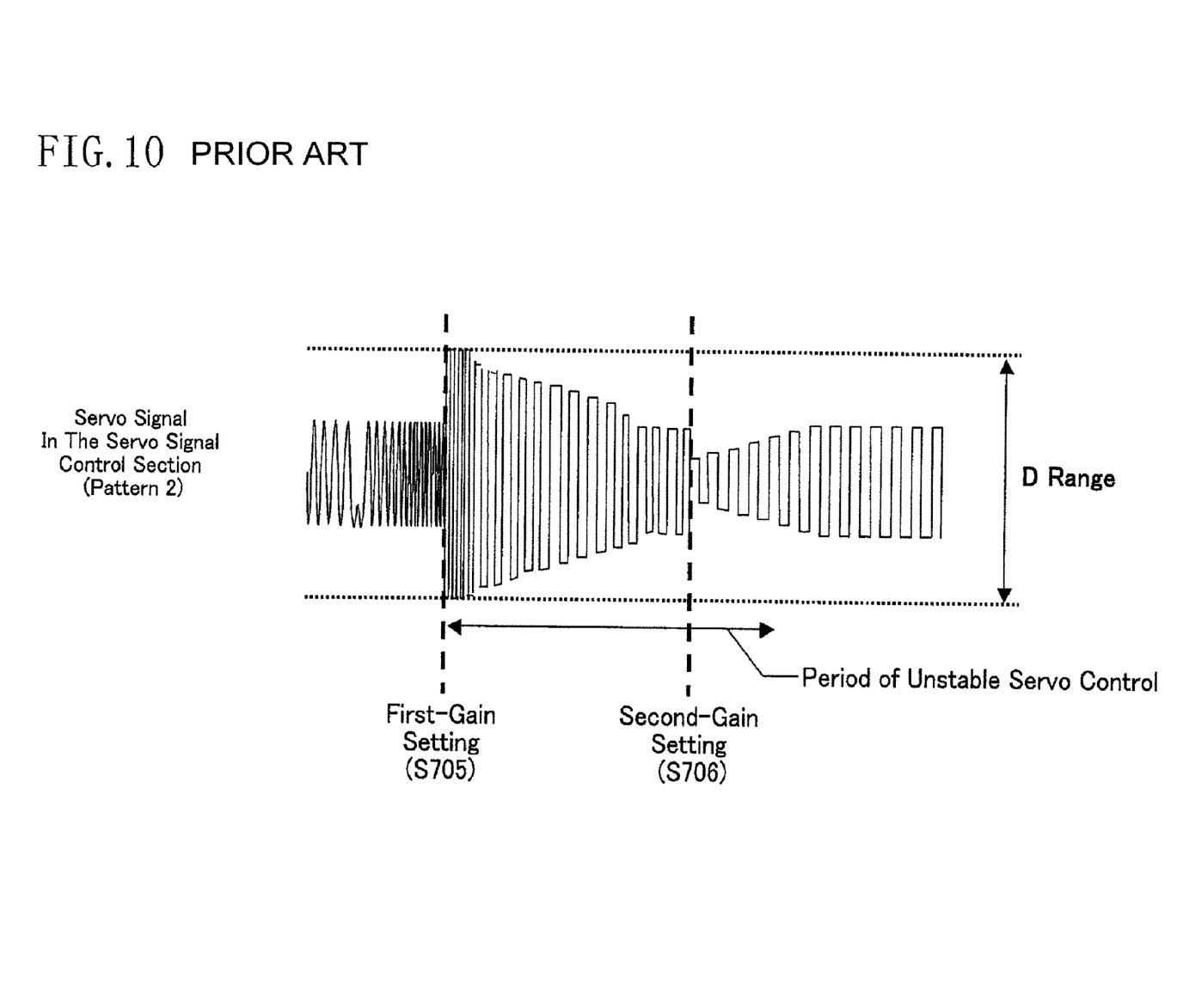
FIG. 10 is a waveform plot of the same, showing another example of waveform of a servo signal controlled by a servo signal control section.

When, after media type identification at step S704, a first gain switching from low gain to high gain at step S705 is followed by a second gain switching from high gain to low gain at step S706, as shown in FIG. 8, the servo signal appears as shown in FIG. 9 or 10.

In FIG. 9, the amplitude of a servo signal first increases upon the first gain switching from low gain to high gain at step S705, then decreases and converges to a constant magnitude under the control by the servo signal control section. Subsequently, the amplitude of the servo signal decreases when the second gain is lowered at step S706, and finally increases and converges to a constant magnitude under the control by the servo signal control section.

Accordingly, a flow shown in FIG. 7 may cause unstable servo signals, which can result in servo failure (e.g., focus failure), during the period between the first-gain setting operation at step S705 and the second-gain setting operation at step S706, or immediately after the second-gain setting operation at step S706.

Moreover, in FIG. 10, the amplitude of a servo signal significantly increases upon the first gain switching from low gain to high gain at step S705. This results in saturation of the servo signal, thus causing the servo signal to exhibit a rectangular wave whose waveform is not what is expected. This situation is likely to occur due to a small dynamic range (D range) of servo signals in the servo signal control section, especially in optical disk apparatuses that deal with lower voltage servo signals. Afterwards, the amplitude of the servo signal decreases and converges to a constant magnitude under the control by the servo signal control section. Subsequently, the amplitude of the servo signal decreases when the second gain is lowered at step S706, and finally increases and converges to a constant magnitude under the control by the servo signal control section.

Thus, a flow shown in FIG. 7 may also produce a rectangular wave servo signal after the first-gain setting operation at step S705.

Figure 11:
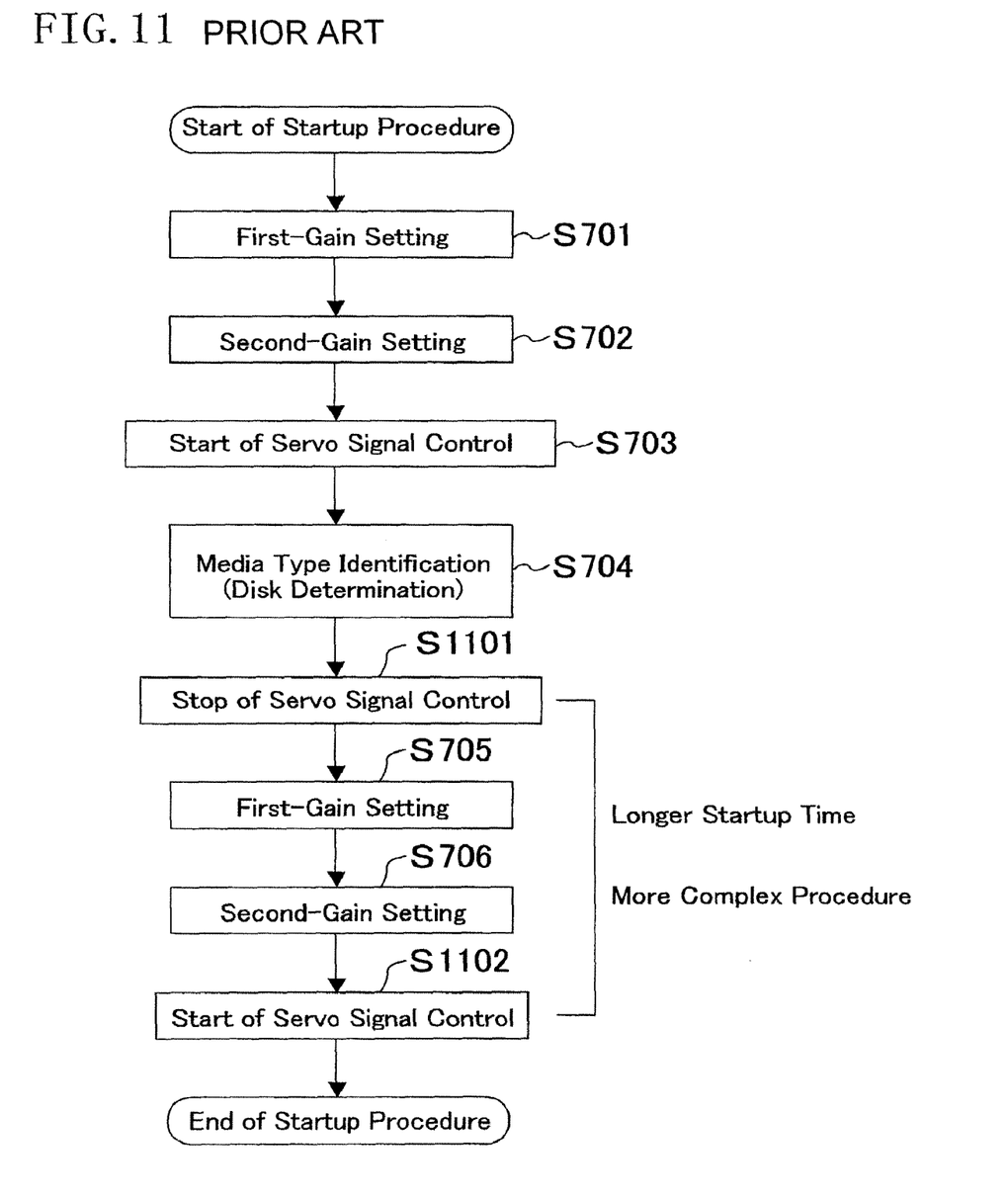
FIG. 11 is a flowchart showing a startup procedure to be executed by an optical disk apparatus, on the assumption that servo signal control process is once stopped after the media type is identified.

Now, as shown in FIG. 11, in order to avoid the above-mentioned servo failure, after media type identification, servo signal control performed by the servo signal control section is once stopped at step S1101, then the first and the second gains are set at steps S705 and S706 respectively, and finally servo signal control performed by the servo signal control section is restarted at step S1102. This flow, however, will create a problem of a longer startup time and, for optical disk apparatuses that support a plurality of types of media, a problem of a more complex procedure.

In view of the foregoing, it is an object of the present invention to perform stable control of servo signals without introducing a more complex procedure or causing a longer startup time.

Means for Solving the Problems

In order to overcome these disadvantages, a signal processing device for optical disks in accordance with the first embodiment of the present invention is characterized in that it includes a reflected light process section configured to convert reflected light received by an optical pickup into an electric signal based on a first gain, wherein the optical pickup emits laser light to an optical disk and receives reflected light from the optical disk; a servo signal generation section configured to generate a servo signal by using the electric signal generated by the reflected light process section; a servo signal control section configured to control the servo signal so that a change in the amplitude of the servo signal, in response to an increase or decrease of the amount of the reflected light from the optical disk, is suppressed using an attenuator that attenuates the servo signal generated by the servo signal generation section by a factor of a second gain; and a gain setting section configured to set the first gain to the reflected light process section and the second gain to the servo signal control section substantially simultaneously.

Thus, the first and the second gains are set substantially simultaneously, thereby hardly causing a period of unstable servo signal, even if these gain setting operations are performed during servo signal control process by the servo signal control section. Accordingly, stable control of servo signals is performed without introducing a more complex procedure or causing a longer startup time.

A signal processing device for optical disks in accordance with the second embodiment of the present invention includes a reflected light process section configured to convert reflected light received by an optical pickup into an electric signal based on a first gain, wherein the optical pickup emits laser light to an optical disk and receives reflected light from the optical disk; a servo signal generation section configured to generate a servo signal by using the electric signal generated by the reflected light process section; a servo signal control section configured to control the servo signal so that a change in the amplitude of the servo signal, in response to an increase or decrease of the amount of the reflected light from the optical disk, is suppressed using an attenuator that attenuates the servo signal generated by the servo signal generation section by a factor of a second gain; and a gain setting section configured to set the second gain to the servo signal control section in a stepwise fashion, and to set the first gain to the reflected light process section within the period from the start to end of the stepwise setting operation of the second gain.

Thus, the first gain is set within the period from the start to end of a stepwise setting operation of the second gain, thereby reducing a period of unstable servo signal, even if these gain setting operations are performed during servo signal control process by the servo signal control section. Accordingly, stable control of servo signals is performed without introducing a more complex procedure or causing a longer startup time.

ADVANTAGES

The present invention allows the first and the second gains to be set substantially simultaneously, thereby hardly causing a period of unstable servo signal, even if these gain setting operations are performed during servo signal control process by the servo signal control section. Accordingly, stable control of servo signals is performed without introducing a more complex procedure or causing a longer startup time.

EXPLANATION OF REFERENCE SYMBOLS

100 Optical disk apparatus
101 Optical disk
102 OPU (optical pickup)
103 OEIC (reflected light process section)
104 FEP (servo signal generation section)
106 AGC (servo signal control section)
110 Gain setting section
120 Signal processing device for optical disks
200 Optical disk apparatus
201 Stepwise gain setting section (gain setting section)
220 Signal processing device for optical disks
300 Optical disk apparatus
301 Gain calculation section
320 Signal processing device for optical disks
400 Optical disk apparatus
401 Gain offset setting section (gain setting section)
402 Offset control block (offset control section)
420 Signal processing device for optical disks

BEST MODE FOR CARRYING OUT THE INVENTION

Preferred embodiments of the present invention are described below in detail with reference to the drawings. It should be noted that identical or similar elements are assigned with same reference numerals throughout the description of the embodiments, and will not be repeatedly described.

Embodiment 1

Figure 1:
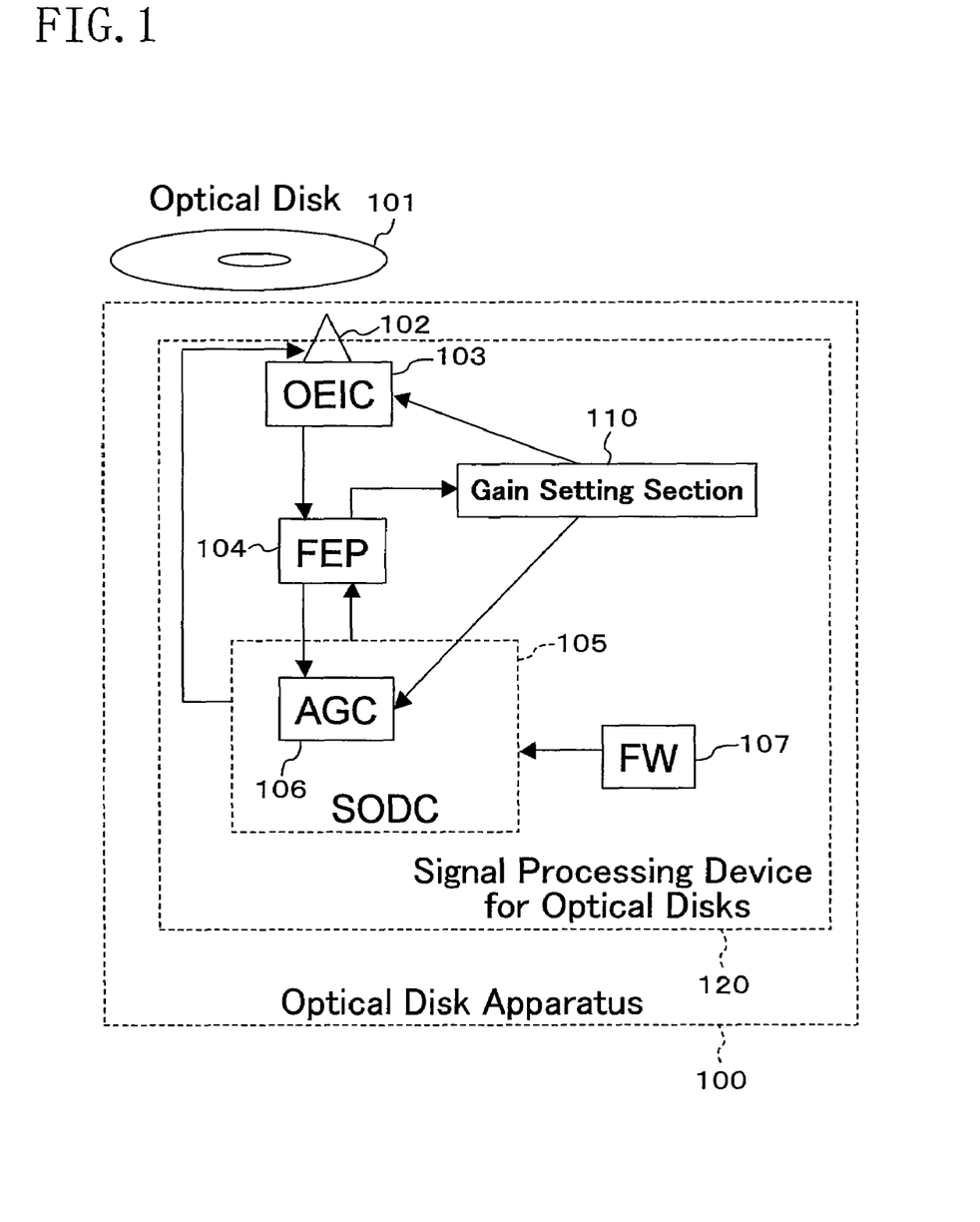
FIG. 1 is a block diagram of an optical disk apparatus 100 in accordance with the embodiment 1.

As shown in FIG. 1, an optical disk apparatus 100 in accordance with the embodiment 1 of the present invention includes an optical pickup (OPU) 102 (optical pickup), which emits laser light to an optical disk 101 and receives reflected light from the optical disk 101; an opto-electronic integrated circuit (OEIC) 103 (reflected light process section), which converts the reflected light received by the OPU 102 into an electric signal based on a preset value of a first gain; a front end processor (FEP) 104 (servo signal generation section), which generates servo signals, such as focus error signals which represent focusing error and tracking error signals which represent tracking error, by using the electric signal generated by the OEIC 103; an automatic gain control (AGC) 106 (servo signal control section), which controls the servo signal so that a change in the amplitude of the servo signal, in response to an increase or decrease of the amount of the reflected light from the optical disk 101, will be suppressed using an attenuator that attenuates the servo signal generated by the FEP 104 by a factor of a second gain; a gain setting section 110, which simultaneously sets the first gain to the OEIC 103 and the second gain to the AGC 106 (more specifically the attenuator in the AGC 106).

The AGC 106 is included in a super-optical disk controller (SODC) 105 (optical disk controller LSI), which integrates a CPU (not shown). The optical disk apparatus 100 further includes a firmware section (FW: system control firmware section) 107, which stores instructions executed by the CPU and the gain setting section 110. The gain setting section 110 simultaneously sets the first gain to the OEIC 103 and the second gain to the AGC 106, by executing instructions stored in the FW 107.

The OEIC 103, the FEP 104, the SODC 105, the FW 107, and the gain setting section 110 constitute a signal processing device for optical disks 120. The signal processing device for optical disks 120 is implemented by one or more integrated circuits.

The setup procedure by the optical disk apparatus 100 thus configured is described below.

First, the CPU sets the first and the second gains to predetermined values respectively. Under this condition, the AGC 106 starts servo signal control process. Then, the media type is identified based on a focus error signal, which is part of the servo signals obtained by the FEP 104. Next, the gain setting section 110 executes instructions stored in the FW 107, thereby setting the first gain to the OEIC 103 and the second gain to the AGC 106 simultaneously. This completes the setup procedure.

This embodiment allows both the first and the second-gain setting operations to be performed simultaneously, keeping the amplitude of servo signals nearly constant. This allows for stable control of servo signals.

In a case where the SODC 105 has a digital signal processor (DSP) intended for servo operations and a memory that stores ROM code to control the DSP (microcode for servo operations), the DSP, which functions as the gain setting section, may execute the ROM code according to instructions stored in the FW 107, thereby setting the first gain to the OEIC 103 and the second gain to the AGC 106 simultaneously. In this case, it is conceivable that a time delay may occur due to register setting operations or the like. Instability of servo signals, however, can be substantially avoided, if a high performance DSP sets the first and the second gains within a time difference equal to or smaller than the inverse number of the response frequency of the servo control. In addition, this configuration allows for cost reduction compared to a case where the gain setting section is implemented by hardware such as an external circuit, because functions of the gain setting section can be added by software modification.

Figure 2:
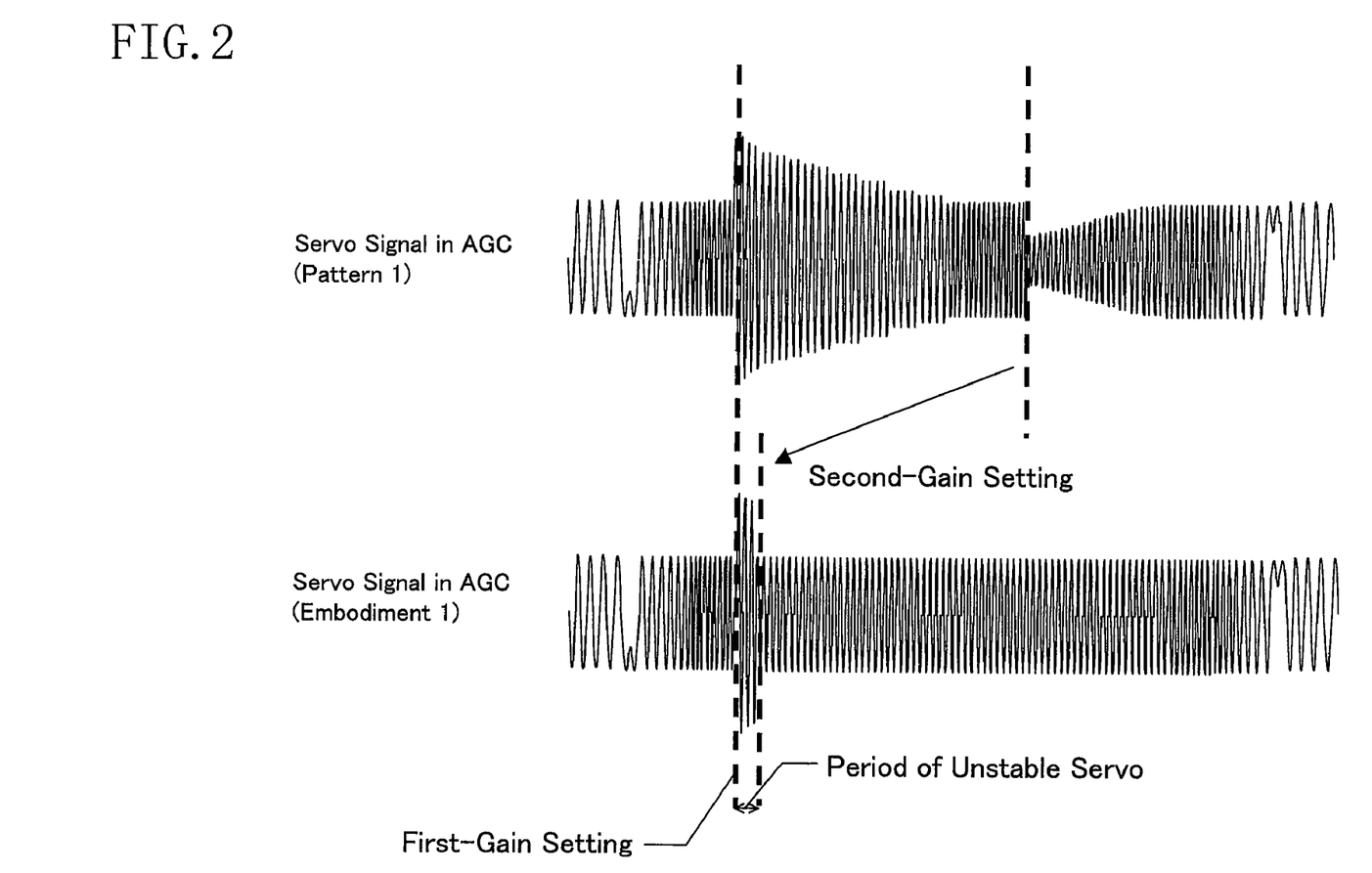
FIG. 2 indicates waveform plots of the same, each showing an example of waveform of a servo signal controlled by AGC 106.

The upper portion of FIG. 2 shows a conventional waveform of a servo signal around the time of setting of the first and the second gains. The lower portion of the same shows a waveform of a servo signal when the time difference between the setting operations of the first and the second gains is equal to or smaller than the inverse number of the response frequency of the servo control.

As shown in the lower portion of FIG. 2, when the time difference between the setting operations of the first and the second gains is equal to or smaller than the inverse number of the response frequency of the servo control, a period of possible unstable control over a servo signal is shortened, thus allowing for stable control of servo signals. Therefore, for the purpose of the present invention, the term "substantially simultaneously" means that the time difference between the setting operations of the first and the second gains is equal to or smaller than the inverse number of the response frequency of the servo control.

Moreover, although it is conceivable that working voltage of the optical disk controller LSI or the like is further lowered and D range is further reduced in the future, the present invention may effectively avoid a situation where a servo signal becomes a square wave as shown in FIG. 10.

Note that the gain setting section 110 may be provided inside of the SODC 105 as well as outside of the SODC 105. In connection with expected further development of single-chip integration of LSIs in the future, integration of the FEP 104 or the OEIC 103 into the SODC 105 would reduce an effect of signal delay in circuits or the like, thereby facilitating signal transmission. This will make implementation of the present invention easy.

Embodiment 2

Figure 3:
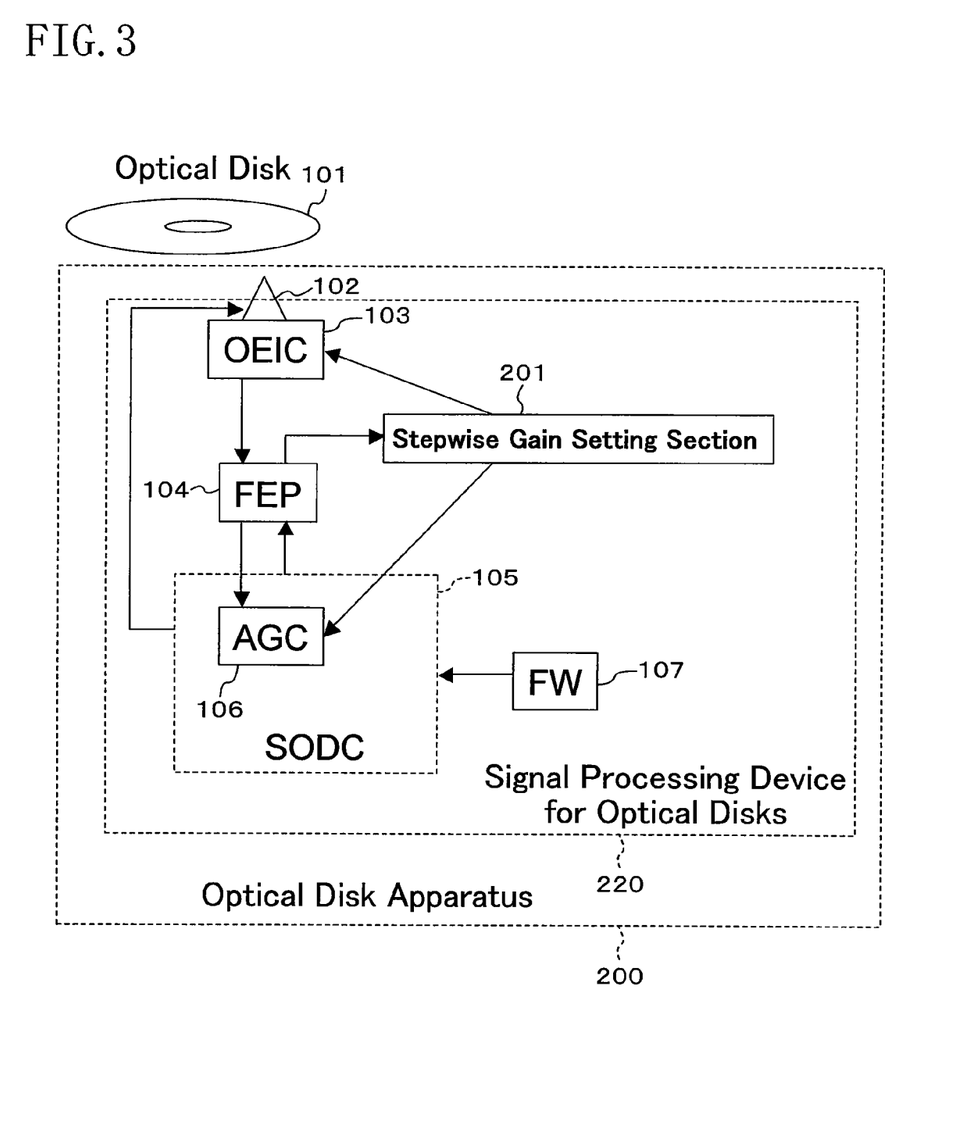
FIG. 3 is a block diagram of an optical disk apparatus 200 in accordance with the embodiment 2.

As shown in FIG. 3, an optical disk apparatus 100 in accordance with the embodiment 2 of the present invention includes a stepwise gain setting section 201 (gain setting section), which sets the first gain to the OEIC 103 and the second gain to the AGC 106, instead of the gain setting section 110 of the embodiment 1. The stepwise gain setting section 201 sets the second gain to the AGC 106 in a stepwise fashion. More specifically, it sets the first gain to the OEIC 103 at the time when it starts stepwise setting operation of the second gain. The stepwise gain setting section 201 sets the first gain to the OEIC 103 and the second gain to the AGC 106 both by executing instructions stored in the FW 107. Furthermore, the OEIC 103, the FEP 104, the SODC 105, the FW 107, and the stepwise gain setting section 201 constitute a signal processing device for optical disks 220. The signal processing device for optical disks 220 is implemented by one or more integrated circuits.

Startup procedure performed by the optical disk apparatus 200 is similar to that of the optical disk apparatus 100 of the embodiment 1 until the media type is identified. In the optical disk apparatus 200, after the media type is identified, the stepwise gain setting section 201 sets the first gain to the OEIC 103, and at the same time, starts stepwise setting operation of the second gain to the AGC 106. For example, as shown in the middle portion of FIG. 4, the stepwise gain setting section 201 increases the first gain instantaneously, and at the same time (i.e., in synchronization with the rising edge of the first gain), starts to lower the second gain. The second gain continues to be lowered gradually (in a stepwise fashion).

Figure 4:
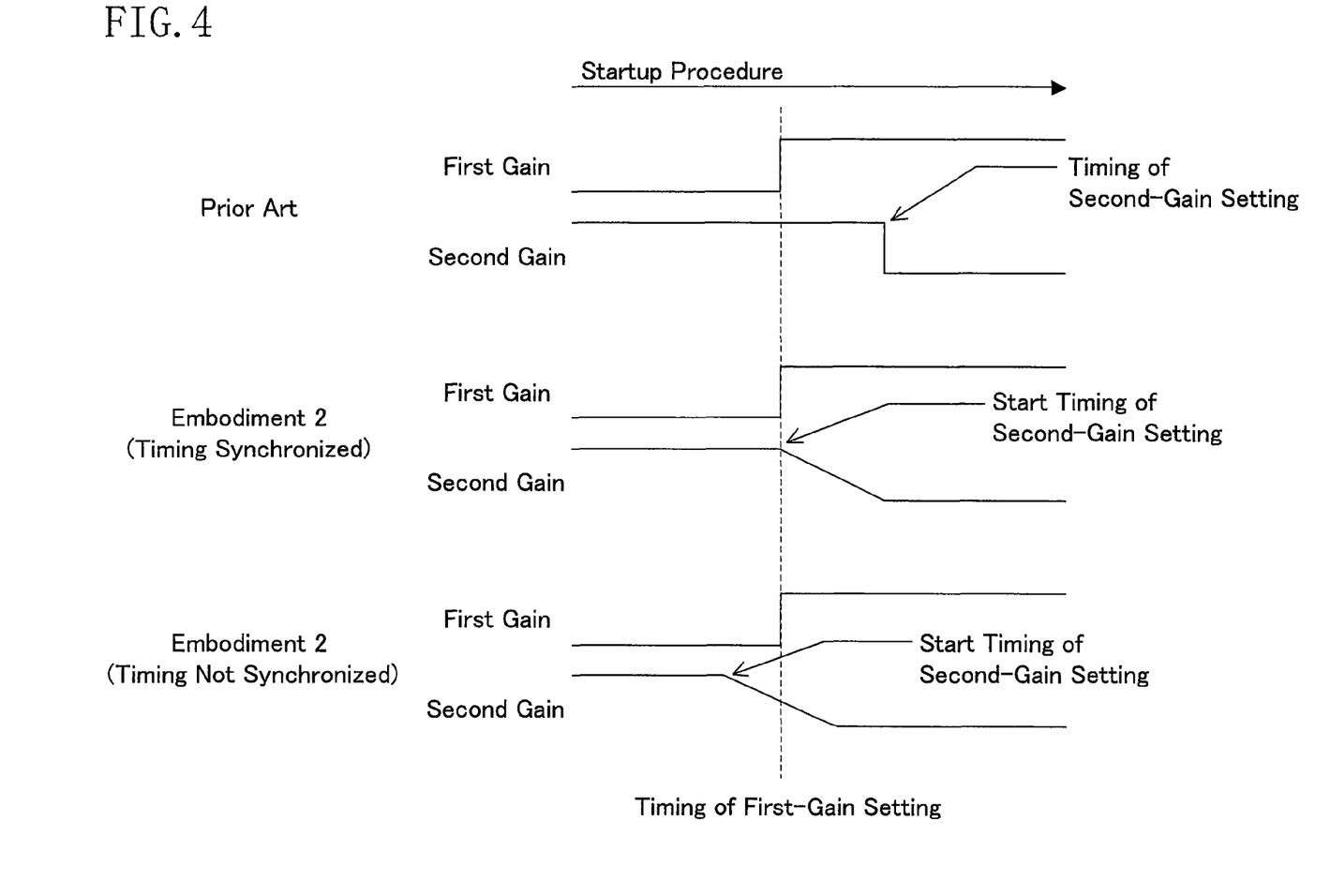
FIG. 4 indicates timing charts of the same, showing levels of the first and the second gains.

Note that the stepwise gain setting section 201 may increase the first gain instantaneously during the stepwise lowering operation of the second gain, as shown in the lowest portion of FIG. 4. Alternatively, the stepwise gain setting section 201 may increase the first gain instantaneously at the end of stepwise lowering operation of the second gain. It should be understood that, in the center and the lowest portions of FIG. 4, even though the second gains are depicted by straight lines, and accordingly may appear to decrease linearly, the fact is that the second gain changes in a stepwise fashion.

In this embodiment, the stepwise setting operation of the second gain makes servo signal saturation less likely to occur compared to conventional systems. As a result, more stable control over servo signals is performed. Furthermore, the stepwise setting operation of the second gain reduces the amount of change in the second gain per a unit time, thus preventing servo control from becoming unstable.

In a case where the SODC 105 has a DSP intended for servo operations and a memory that stores ROM code to control the DSP, the DSP, which functions as the stepwise gain setting section, may execute the ROM code according to instructions stored in the FW 107, thereby setting the first gain to the OEIC 103 and the second gain to the AGC 106. This configuration allows for cost reduction compared to a case where the gain setting section is implemented in hardware such as an external circuit, because functions of the gain setting section can be added by software modification.

Moreover, the stepwise gain setting section 201 may be provided inside of the SODC 105 as well as outside of the SODC 105. In connection with expected further development of single-chip integration of LSIs in the future, integration of the FEP 104 or the OEIC 103 into the SODC 105 would reduce an effect of signal delay in circuits or the like, thereby facilitating signal transmission. This will make implementation of the present invention easy.

Embodiment 3

Figure 5:
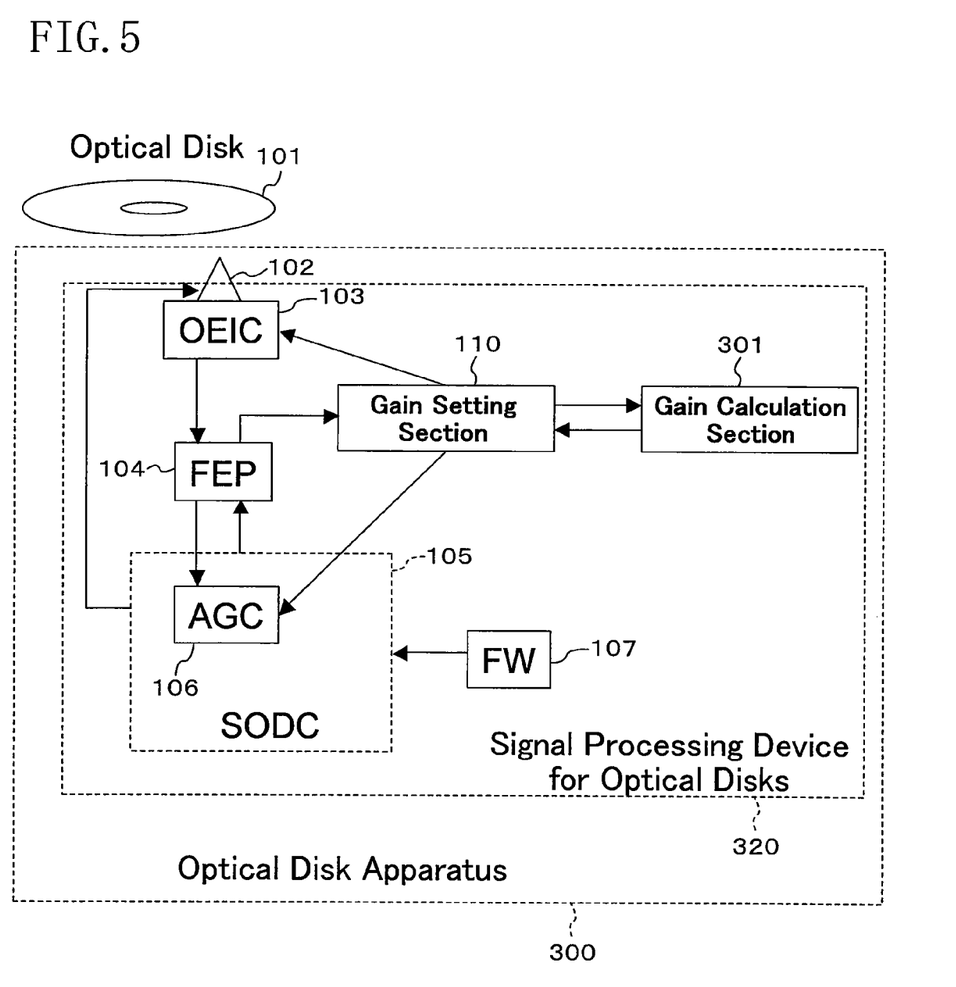
FIG. 5 is a block diagram of an optical disk apparatus 300 in accordance with the embodiment 3.

As shown in FIG. 5, an optical disk apparatus 300 in accordance with the embodiment 3 of the present invention further includes a gain calculation section 301, which calculates the first and the second gains, other than the components included in the optical disk apparatus 100 of the embodiments 1. The gain setting section 110 now sets the first and the second gains calculated by the gain calculation section 301 to the OEIC 103 and the AGC 106 respectively.

The gain calculation section 301 calculates the second gain, for example, by multiplying the first gain by a predetermined factor, or as the inverse number (1/K) of the first gain (K). It should be noted that the calculation methods used by the gain calculation section 301 to obtain the first and the second gains are not limited to these examples.

The OEIC 103, the FEP 104, the SODC 105, the FW 107, the gain setting section 110, and the gain calculation section 301 constitute a signal processing device for optical disks 320. The signal processing device for optical disks 320 is implemented by one or more integrated circuits.

In this embodiment, calculation of the first and the second gains by the gain calculation section 301 eliminates the need for setting fixed values as the initial values of the first and the second gains. This also allows more appropriate servo signals to be generated.

The gain calculation section 301 may calculate only one of the first and the second gains.

Alternatively, the optical disk apparatus 200 of the embodiment 2 may further include a gain calculation section 301, which calculates at least one of the first and the second gains to be set by the stepwise gain setting section 201.

Embodiment 4

Figure 6:
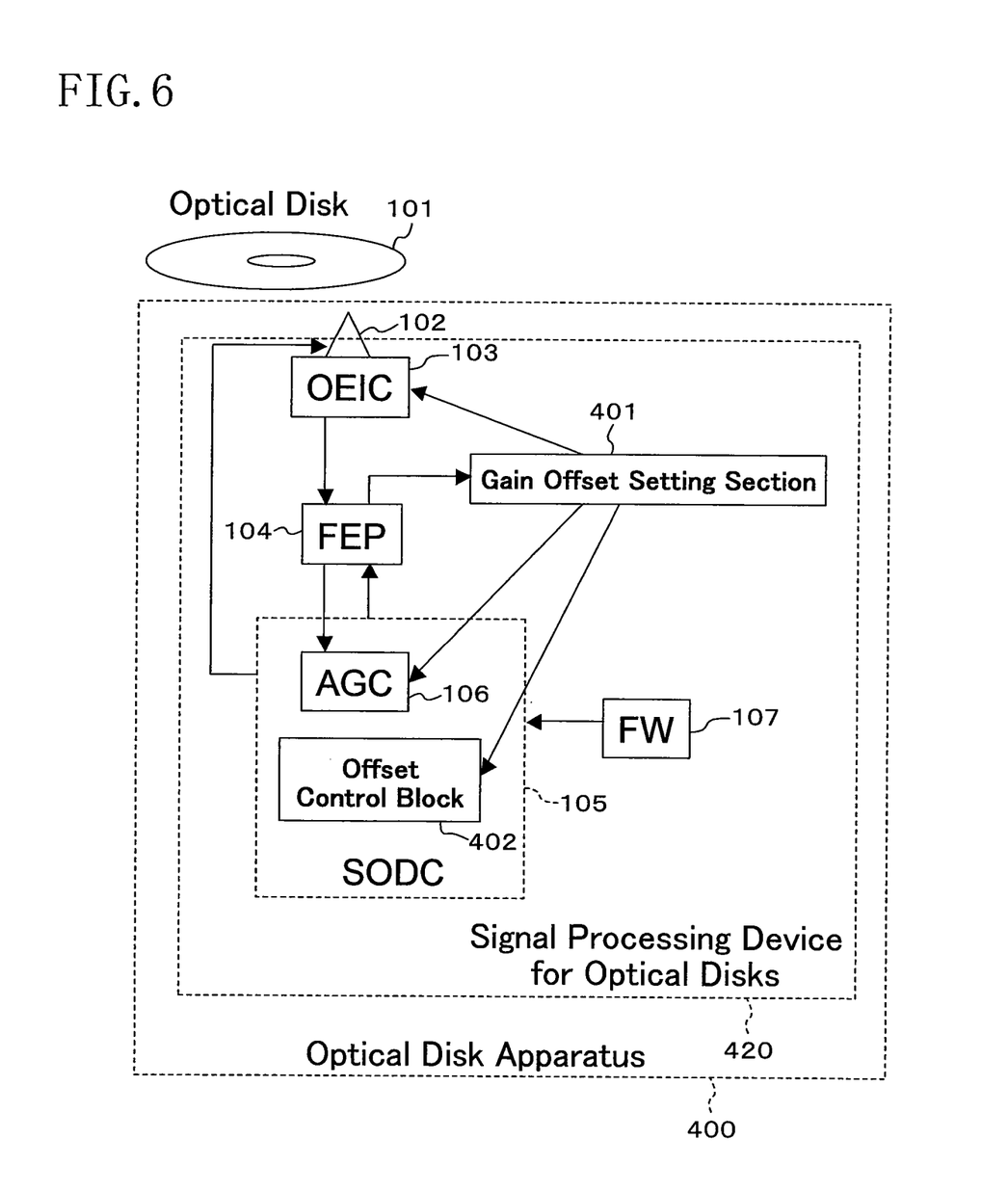
FIG. 6 is a block diagram of an optical disk apparatus 400 in accordance with the embodiment 4.

As shown in FIG. 6, an optical disk apparatus 400 in accordance with the embodiment 4 of the present invention is different from the optical disk apparatus 100 of the embodiment 1 in that it further includes, within the SODC 105, an offset control block 402 (offset control section), which adds or subtracts an offset adjustment value to or from a servo signal generated by the FEP 104 and thereby cancels the offset that occurs in the servo signal, and that it includes, in place of the gain setting section 110, a gain offset setting section 401 (gain setting section), which sets a specific offset adjustment value to the offset control block 402, the first gain to the OEIC 103, and the second gain to the AGC 106 simultaneously. The OEIC 103, the FEP 104, the SODC 105, the FW 107, and the gain offset setting section 401 constitute a signal processing device for optical disks 420. The signal processing device for optical disks 420 is implemented by one or more integrated circuits.

This embodiment allows both the setting operation of the specific offset adjustment value to the offset control block 402 and the setting operation of the first gain to the OEIC 103 to be performed simultaneously. This allows more appropriate servo signals to be generated, and allows for stable control of servo signals.

Note that the setting operation of the offset adjustment value by the offset setting section 401 may not be completely concurrent with the setting operations of the first and the second gains. Instead, a time difference equal to or smaller than the inverse number of the response frequency of the servo control will produce an effect of stabilization of servo signal control. Therefore, for the purpose of the present invention, the term "substantially simultaneously" means that the time difference between the setting operation of the offset adjustment value and the setting operations of the first and the second gains is equal to or smaller than the inverse number of the response frequency of the servo control.

The gain offset setting section 401, as in the optical disk apparatus 200 of the embodiment 2, may set the second gain to the AGC 106 in a stepwise fashion and simultaneously set the specific offset adjustment value to the offset control block 402 and the first gain to the OEIC 103 within the period from the start to end of a stepwise setting operation of the second gain.

Alternatively, the optical disk apparatus 300 of the embodiment 3 may further include the offset control block 402 and have a gain offset setting section 401 instead of the gain setting section 110. In this case, the gain calculation section 301 may calculate the offset adjustment value and the gain offset setting section 401 may set the offset adjustment value calculated by the gain calculation section 301, to the offset control block 402. If the amount of change in offset value is proportional to the amount of change in gain value, the gain calculation section 301 may calculate the offset adjustment value by multiplying the amount of change in gain value by a proportionality constant to obtain the amount of change in offset value, and then adding the obtained amount of change in offset value to the current offset adjustment value. For example, if "the amount of change in gain value":"the amount of change in offset value"=1:3, then a new offset adjustment value can be obtained using the relationship as "new offset adjustment value"="current offset adjustment value"+"the amount of change in gain value"×3. This provides more appropriate value of offset adjustment.

In the embodiments 1 to 4, the FEP 104 and the SODC 105 may be implemented in separated semiconductor integrated circuits (in different packages) or in a single semiconductor integrated circuit (in different packages).

Signal processing devices for optical disks and optical disk apparatuses in accordance with the present invention have an effect that stable control of servo signals can be performed without introducing a more complex procedure or causing a longer startup time. The present invention relates to, for example, signal processing devices for optical disks and optical disk apparatuses that record data on, erase data from, or reproduce data from an optical disk using laser light. More particularly, the present invention is useful for such as signal processing devices for optical disks and optical disk apparatuses that control servo signals.

The invention claimed is:

1. A signal processing device for optical disks comprising:
   a reflected light process section configured to convert reflected light received by an optical pickup into an electric signal based on a first gain, wherein the optical pickup emits laser light to an optical disk and receives reflected light from the optical disk;
   a servo signal generation section configured to generate a servo signal by using the electric signal generated by the reflected light process section;
   a servo signal control section configured to control the servo signal so that a change in the amplitude of the servo signal, in response to an increase or decrease of the amount of the reflected light from the optical disk, is suppressed using an attenuator that attenuates the servo signal generated by the servo signal generation section by a factor of a second gain; and,
   a gain setting section configured to set the first gain to the reflected light process section and the second gain to the servo signal control section substantially simultaneously.

2. An optical disk apparatus comprising:
   the signal processing device for optical disks of claim 1 and, the optical pickup.

3. A signal processing device for optical disks comprising:
   a reflected light process section configured to convert reflected light received by an optical pickup into an electric signal based on a first gain, wherein the optical pickup emits laser light to an optical disk and receives reflected light from the optical disk;
   a servo signal generation section configured to generate a servo signal by using the electric signal generated by the reflected light process section;
   a servo signal control section configured to control the servo signal so that a change in the amplitude of the servo signal, in response to an increase or decrease of the amount of the reflected light from the optical disk, is suppressed using an attenuator that attenuates the servo signal generated by the servo signal generation section by a factor of a second gain; and,
   a gain setting section configured to gradually change the second gain to the servo signal control section, and to set the first gain to the reflected light process section within the period from the start to end of the gradual change of the second gain.

4. The signal processing device for optical disks of claim 1, further comprising a gain calculation section configured to calculate at least one of the first and the second gains, wherein the gain setting section sets each of the at least one gain calculated by the gain calculation section to the corresponding one of the reflected light process section and the servo signal control section.

5. The signal processing device for optical disks of claim 1, comprising an offset control section configured to add or subtract an offset adjustment value to or from the servo signal generated by the servo signal generation section and thereby cancel the offset that occurs in the servo signal, wherein the gain setting section sets the offset adjustment value to the offset control section and the first gain to the reflected light process section substantially simultaneously.

6. The signal processing device for optical disks of claim 1, wherein the signal processing device for optical disks is implemented by one or more integrated circuits.

7. The signal processing device for optical disks of claim 3, further comprising a gain calculation section configured to calculate at least one of the first and the second gains, wherein the gain setting section sets each of the at least one gain calculated by the gain calculation section to the corresponding one of the reflected light process section and the servo signal control section.

8. The signal processing device for optical disks of claim 3, comprising an offset control section configured to add or subtract an offset adjustment value to or from the servo signal generated by the servo signal generation section and thereby cancel the offset that occurs in the servo signal, wherein the gain setting section sets the offset adjustment value to the offset control section and the first gain to the reflected light process section substantially simultaneously.

9. The signal processing device for optical disks of claim 3, wherein the signal processing device for optical disks is implemented by one or more integrated circuits.

10. An optical disk apparatus comprising:
    the signal processing device for optical disks of claim 3 and, the optical pickup.

* * * * *